US008478018B2

(12) United States Patent
Peltier

(10) Patent No.: US 8,478,018 B2
(45) Date of Patent: Jul. 2, 2013

(54) METHOD FOR SAMPLE CELL ANALYSIS USING A VIRTUAL ANALYSIS PLATE

(75) Inventor: Eric Peltier, Clamart (FR)

(73) Assignee: Novacyt, Velizy Villacoublay (FR)

( * ) Notice: Subject to any disclaimer, the term of this patent is extended or adjusted under 35 U.S.C. 154(b) by 50 days.

(21) Appl. No.: 12/995,089

(22) PCT Filed: May 29, 2009

(86) PCT No.: PCT/FR2009/051014
§ 371 (c)(1),
(2), (4) Date: Feb. 25, 2011

(87) PCT Pub. No.: WO2009/156661
PCT Pub. Date: Dec. 30, 2009

(65) Prior Publication Data
US 2011/0158501 A1 Jun. 30, 2011

(30) Foreign Application Priority Data

May 30, 2008 (FR) ...................................... 08 02994

(51) Int. Cl.
*G06K 9/00* (2006.01)
*C12N 5/00* (2006.01)
*G01N 33/554* (2006.01)

(52) U.S. Cl.
USPC ............................ 382/133; 435/410; 436/519

(58) Field of Classification Search
USPC ............. 382/128–134; 435/4, 7.2, 7.22, 7.33, 435/7.34, 34, 37, 38, 39, 7.21, 7.23, 40.5, 435/41, 70.1, 70.4, 410, 440, 451, 452; 436/46, 436/47, 174, 177, 181, 519, 521, 522
See application file for complete search history.

(56) References Cited

U.S. PATENT DOCUMENTS

| 6,441,894 | B1 * | 8/2002 | Manian et al. | 356/123 |
| 7,155,043 | B2 * | 12/2006 | Daw | 382/128 |
| 7,186,522 | B2 * | 3/2007 | Lapen et al. | 435/40.5 |
| 7,582,415 | B2 * | 9/2009 | Straus | 435/4 |
| 2008/0032328 | A1 | 2/2008 | Cline et al. | |

FOREIGN PATENT DOCUMENTS

WO WO 00/75709 A1 12/2000
WO WO 01/84209 A2 11/2001

OTHER PUBLICATIONS

Doliner et al., "The false-negative fraction: A statistical method to measure the efficacy of cervical smear screening laboratories," *Military Medicine* (1999) 164 (6): 410-411. XP009110406.

* cited by examiner

*Primary Examiner* — Abolfazl Tabatabai
(74) *Attorney, Agent, or Firm* — Merchant & Gould P.C.

(57) ABSTRACT

A method includes carrying out at least a first processing of a sample (2), the processing being adapted to mark pathological cells among the sample cells; and carrying out several image acquisitions of the sample (2) provided on an analysis plate (6) in order to obtain images each representing an area of the analysis plate (6) wherein the images set side by side define an image (20) of the entire sample. The method further includes automatically running all the acquired images of the sample (2) on a display at a predetermined running speed, the speed being adapted for enabling an observer to analyze the image and to determine if the represented sample area includes potentially pathological cells or not; and stopping the running if at least one abnormality is detected that may indicate the presence of a pathological cell.

15 Claims, 2 Drawing Sheets

METHOD FOR SAMPLE CELL ANALYSIS USING A VIRTUAL ANALYSIS PLATE

Figure 1:
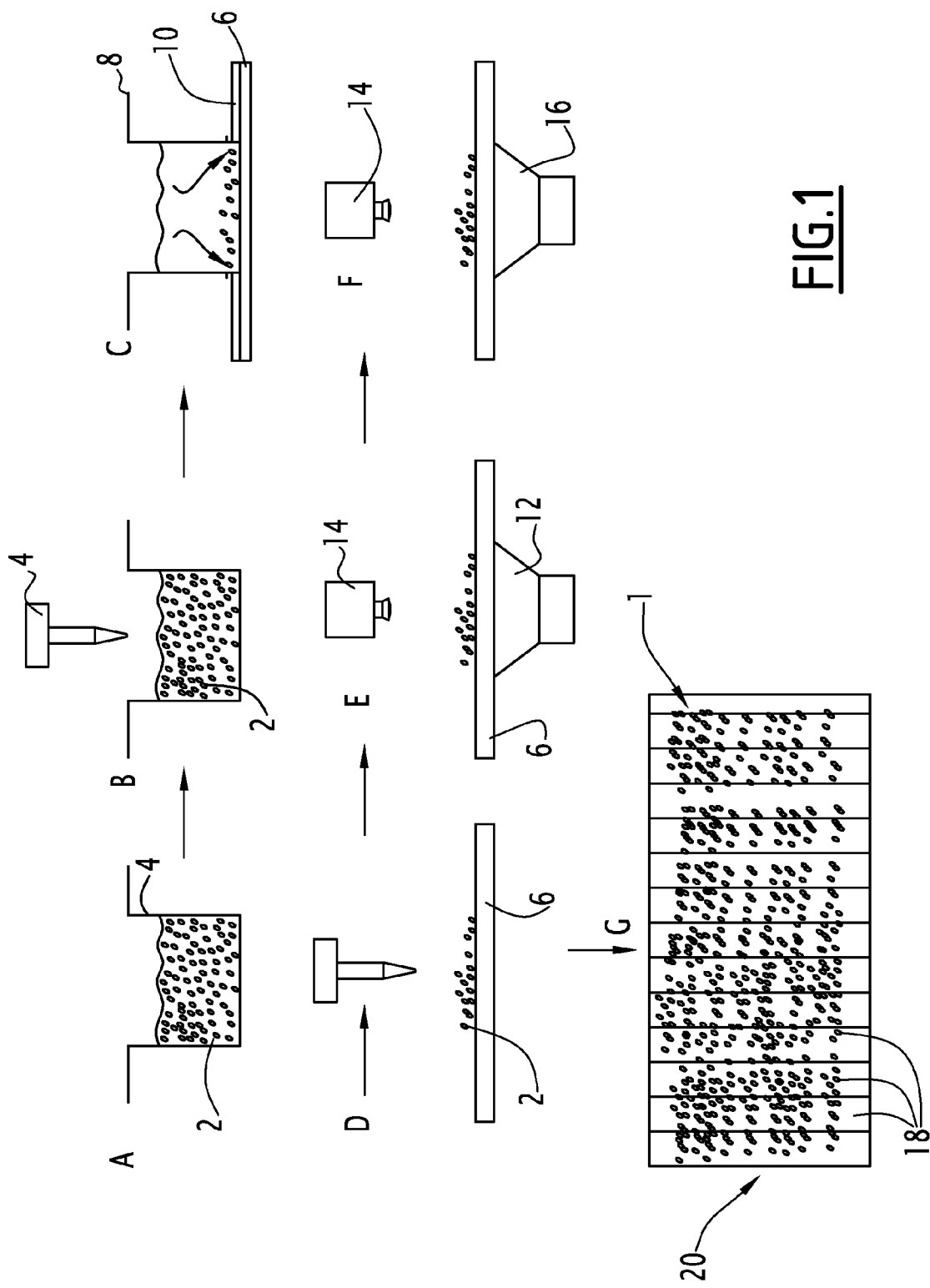

This application is a National Stage Application of PCT/FR2009/051014, filed May 29, 2009, which claims benefit of Ser. No. 0802994, filed May 30, 2008 in France and which applications are incorporated herein by reference. To the extent appropriate, a claim of priority is made to each of the above disclosed applications.

The present invention relates to a method for cell analysis of a cytological or histological sample placed on an analysis plate, of the type comprising the following steps:
- carrying out at least a first processing of the sample, said processing being adapted so as to allow differentiation of the pathological cells from healthy cells of the sample,
- carrying out acquisition of images of the sample placed on the analysis plate so as to obtain a plurality of images each representing an area of the analysis plate, said images set side by side forming an image of the entire sample.

The invention particularly applies to methods for cytological or histological analysis.

The invention also relates to a method for preparing a plate for virtual analysis of a sample with a view to allowing its cell analysis, notably according to an analysis method as described above.

Analysis of samples is for example used for diagnosing pathologies, for example from cells sampled by smears (cervical, vaginal or other smears), by puncture of organs (breast, thyroid, ganglion or other organs) or further by collection (urine, broncho-alveolar lavage or other collections), in order to detect any type of pathology and more particularly pre-cancerous or cancerous conditions.

The samples are examined by specialized and trained observers for detecting cells which may be pathological in a sample placed on an analysis plate or analysis slide. In order to allow detection of potentially pathological cells, the sample undergoes processing, such as staining with which the characteristics of the nucleus and the cytoplasm of the cells may be made conspicuous I.a., in order to contribute to locating and diagnosing pathological cells. When the sample is observed, the potentially pathological cells then show differences in tinctorial affinities, in size and shape, both at the nucleus and at the cytoplasm as compared with normal cells.

The analysis may be carried out manually, without any particular assistance. In this case, the physician (doctor) or the specialized technician has the sample plates pass under a microscope and observes each of them with view to detecting morphological abnormalities indicating pathological cells which may correspond to a pre-cancerous or cancerous condition, for example. Such an analysis method is tedious and consumes a considerable amount of time. Further, it does not provide satisfactory results with especially a number of "false negatives" estimated to be about 30% i.e. samples considered as normal even though there exists a pathology in the patient, notably a pre-cancerous or cancerous pathology with risks of subsequent development of cancer in a wrongly reassured patient.

In order to improve the results of the analysis, improvement in the sampling was suggested, i.e. the number of cells, their fixation, their coloration and their spreading on the analysis plate, but also by helping the physician or the specialized technician in his/her analysis for example by computer analysis means such as software packages for processing images and other software.

For this purpose, a video or still camera is used for acquiring images of different areas of the sample positioned on the analysis plate and passing on the data of these images to a computer system which then operates on a <<virtual>> analysis plate.

This computer system allows signal processing, pre-processing of the images and comparative analysis of the images with optionally newly created or existing databases in order to accelerate the analysis process and thereby allow analysis of a larger number of samples and in order to assist the physician or the specialized technician. The images of a sample are for example examined automatically and if certain areas having an abnormality are reported, the corresponding images are sent to a physician or specialized technician who may then determine whether these areas show pathological cells or not. The physician or the specialized technician therefore only observes abnormal areas without analysing the areas considered as normal by the computer system. Such a method actually allows acceleration of the analysis.

However the physician or the specialized technician then no longer has the opportunity of observing normal samples or those having minor morphological changes, which are detrimental to his/her appreciation of the samples and especially for his/her learning curve or even for preserving his/her diagnostic acumen. Indeed, the analysis of samples relies on the training and practice of the physician or of the specialized technician in examining samples and in comparing normal areas and areas having abnormalities. Suppressing this practice by computer-aided analysis may lead physicians or specialized technicians to losing their skills and thereby cause errors in analysis.

The invention aims at overcoming the aforementioned drawbacks by proposing an analysis method which, while being assisted in order to allow a notable gain in time, also allows physicians or specialized technicians to practice observation of both normal and abnormal samples.

For this purpose, the invention relates to an analysis method of the aforementioned type further comprising the following steps:
- automatically scrolling all the acquired images of the on a display means at a predetermined scrolling rate, said rate being adapted so as to allow an observer to analyse the image and to determine whether the represented sample area comprises cells which are potentially pathological cells or not,
- stopping the scrolling if at least one abnormality is detected which may signify the presence of a pathological cell,
- and in that stopping of the scrolling is achieved automatically following automated analysis of the image, said stopping being carried out if a particular object, defined as being abnormal, is detected in the image.

Thus, the physician or the specialized technician observes both the normal areas and the abnormal areas of the sample and the analysis is faster than manual analysis because of the automatic scrolling of the read images. Further, the method according to the invention allows entire reconstruction of the image of a sample in order to do without the use of a microscope, and this by means of a still camera allowing acquisition of images representing the totality of the surface of the analysis plate, as this will be described later on.

According to other features of the analysis method:
- the scrolling rate of the images is adjustable,
- the method further comprises a step for restarting the scrolling after analysis of the area of the sample having an abnormality, said restarting step being controlled by the observer, the method comprises a step for automatically stopping the scrolling on an image which does not have any abnormality or corresponding to objects required for evaluating the representativity of the sample, the restarting of the scrolling being controlled by the observer after validation that the image does not have any abnormality, two different processing operations are carried out on the sample, said processing operations being adapted so as to allow labeling of pathological cells among the cells of the sample, two image acquisition steps being carried out, each acquisition step allowing the detection of abnormalities according to one of the processing operations carried out on the sample, the data of the acquired images by each acquisition step being superimposed so as to allow the observer to switch from the image of an acquired area according to an acquisition step, to the image of the same acquired area according to another acquisition step during the scrolling of the images, switching from the image of an area according to an acquisition step to the acquired image of the same area according to the other acquisition step is accomplished when an abnormality has been detected in the image, the processing steps are steps for staining or labeling the sample with fluorophores, the display of the acquired image according to the other acquisition step is accompanied by the display of information on the displayed sample area and/or on the entirety of the sample and/or on the patient on which the sampling was carried out, the method comprises a step for enlarging an image in order to allow viewing of a detail of the displayed area, the enlargement rate is adjustable.

The invention also relates to a method for preparing a plate for virtual analysis of a sample with a view to allowing its cell analysis of the type comprising the following steps:

preparing a sample, carrying out a first step for processing the sample, said processing operation allowing labeling of pathological cells with respect to the other cells, carrying out a second step for processing the sample, said processing operation allowing labeling of pathological cells with respect to the other cells, in a different way from the first processing step, depositing the sample on an analysis plate before or after or between the steps for processing the sample.

This method further comprises the following steps:

carrying out a first acquisition of images of the sample placed on the analysis plate so as to obtain a plurality of images each representing an area of the analysis plate, said images set side by side forming an image of the entire sample, said images allowing detection of pathological cells labeled by the first processing step, carrying out a second acquisition of images of the sample placed on the analysis plate so as to obtain a plurality of images each illustrating an area of the analysis plate, said images set side by side forming an image of the entire sample, said images allowing detection of cell abnormalities other than those labeled by the first processing step, said acquired images forming a virtual analysis plate.

With such a method, it is possible to produce in a particularly simple way an image of a sample allowing detection of potentially pathological cells in two different ways and acquisition of a large amount of information on the sample, as this will be described later on.

According to other features of the preparation method:

the method further comprises a step for superimposing the data of the images acquired during the first acquisition of the images and those of the images acquired during the second acquisition of the images, the first step for processing the sample is a fluorescence labeling step, the first processing step comprises a step for introducing reference beads in the sample, said beads being used as controls for the focusing of the image acquisition, the second step for processing the sample is a Papanicolaou staining step.

A virtual analysis plate obtained by the preparation method described above is then analysed by the analysis method described above.

Figure 2:
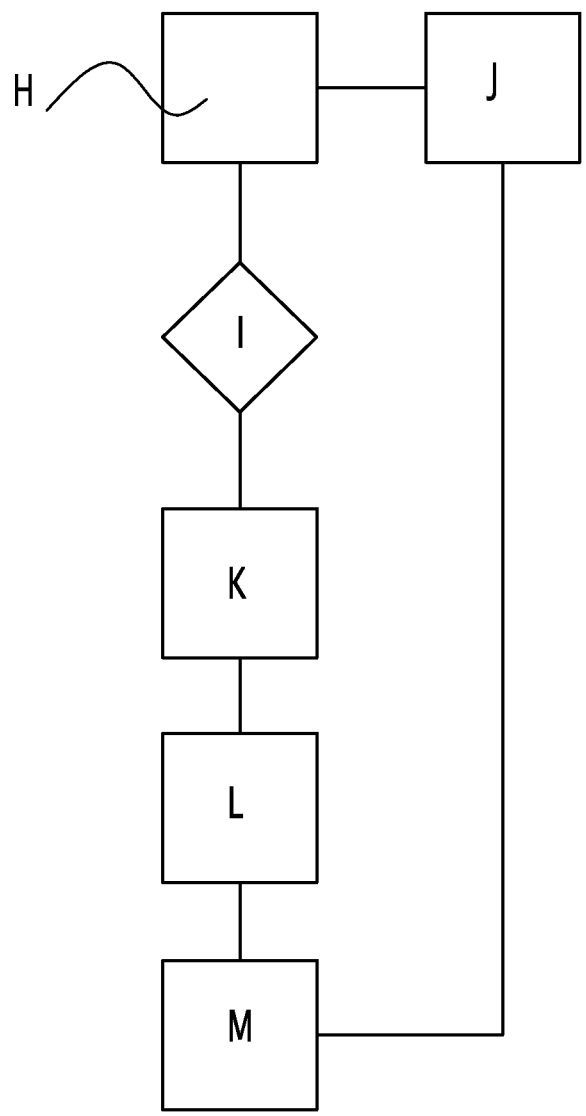

Other aspects and advantages of the invention will become apparent upon reading the description which follows, given as an example and made with reference to the appended drawings, wherein:

FIG. 1 is a schematic illustration of the different steps of a method for preparing a virtual analysis plate according to the invention, FIG. 2 is a flowchart illustrating the different steps of a cell analysis method according to the invention.

With reference to FIG. 1, a method for preparing a virtual analysis plate 1 is described with a view to its cell analysis assisted by a computer system. By virtual plate 1 is meant a set of grouped pieces of information and digital data relating to a sample 2.

The sample 2 is for example obtained by smears (cervical, vaginal or other smears), by puncture of organs (breast, thyroid, ganglion or other organs) or further by collection (urine, broncho-alveolar lavage or other collections). During a first step A, the sample is suspended for example in a sample tube or flask 4.

During a step B, the sample is subject to a first processing operation aiming at labeling (marking) the pathological cells with respect to the other cells. According to an embodiment, this first processing operation is fluorescence labeling which not only allows labeling of pathological cells but also determination of several characteristics of the sample. Indeed, this labeling by fluorescence shows a specific component of the nucleus or of the cytoplasm and allows it to be enhanced relatively to each other with the purpose of selecting potentially pathological cells. Such labeling when it is DNA-specific allows quantification of the DNA of the cells of the sample for analysis of ploidy for example, or, when it is specific of a molecule or an oncogenic virus, such as the Human Papilloma Virus, in the case of uterine cervix smear for example, targeting potentially pathological cells.

Fluorescence labeling is for example accomplished automatically by means of a robot 4 provided with pipetting means used both for putting the sample in solution and for mixing the sample with fluorescent molecules. According to an embodiment, reference beads are introduced into the solution of the sample 2. Such beads are labeled with a fluorescent molecule and allow automatic focusing to be facilitated during the acquisition of images of the sample, as this will be described later on.

During a step C, the labeled sample 2 is positioned on an analysis plate 6. In a known way, deposition of the cells on the plate 6 is for example accomplished by decantation. The sample 2 is poured into a decantation chamber 8, the bottom of which is open on the analysis plate 6. Absorption means 10 allow absorption of the solution as the cells are gradually deposited on the analysis plate 6. Such a deposition method is known and will not be described in detail here.

During step D, the sample 2 is subject to a second processing operation aiming at staining the cells as this is conventionally described and known for morphological analysis by one skilled in the art. According to an embodiment, this second processing operation is Papanicolaou staining. Such a staining has been known for a long time and the semiology, broadly described in the literature, allows possible recognition of abnormalities for example, corresponding to the presence of pre-cancerous or cancerous cells. With this staining, it is also possible to recognize the different types of cells and their number in order to determine the representative quality of the sample and for example define whether the sample is representative or not. The Papanicolaou staining step may also be carried out with automatic pipetting means.

The step for decanting the cell suspension may be carried out before, after or between the labeling and staining steps described above.

The step described above associating fluorescence labeling and a known stain for cell analysis are simple to achieve and with them it is possible to obtain a sample which is easily legible and they provide important complementary information on the sample. Other stains used in the state of the art may be used, but they have drawbacks. Thus, stoichiometric staining may be contemplated, which provides a stain of the cells proportional to the amount of DNA, which allows quantification and therefore localisation and analysis of pathological cells within the scope of ploidy. However, this particular stain, when this is Feulgen staining for example, is incompatible with Papanicolaou staining and therefore requires re-spreading of the cells on a slide for analysis by the physician or cytotechnician. Certain industrialists have tried to associate stoichiometric staining with Papanicolaou staining and have therefore used a stain containing a thionine and requiring fixation with methanol which is toxic, and especially which modifies the Papanicolaou stain in its interpretation, notably with nuclei for which chromatin appears to "black" for a fine analysis of the composition of said nuclei, and therefore entails difficulty in analysis for the diagnose of pre-cancerous or cancerous conditions.

A different label (marker) of the labels used for quantifying DNA may be used, such as hypericin or a specific proliferation or pathogenic agent label such as oncogenic viruses of the Human Papilloma Virus, in the case of uterine cervix smear for example.

During step E, the analysis plate 6 comprises the sample, containing one or more specific fluorescent labeling agents and stained by a staining agent known for morphological analysis of the cell as well as fluorescent reference beads with which handling of the focusing may be improved, is one or several times subject to a source of continuous or pulsed excitation light source for fluorescence, either coherent or not, in any spectral field ranging from ultraviolet to infrared, illuminating the sample in order to acquire images of the sample by means of an apparatus for acquiring images 14. By acquiring fluorescence images, it is possible to carry out automatic focusing by means of the fluorescent reference beads and thereby obtain the greatest number of images with optimum focusing. The whole of the images of the sample obtained in fluorescence, may correspond to one or several illuminations of the fluorescence excitation light source, allowing normal cells to be differentiated from pathological cells.

During step F, the analysis plate 6 comprising the sample, containing one or more specific fluorescent labeling agents and stained by a staining agent known for morphological analysis of the cell, is subject to illumination in white light 16 in order to acquire images of the sample by means of the image acquisition device 14. By acquiring images in white light, it is possible to obtain images of the sample stained by the Papanicolaou stain and enhance the standard diagnostic criteria used by one skilled in the art for making a diagnosis.

Acquisition of images in fluorescence is carried out before acquiring images in white light in order to avoid bleaching phenomena of the image which would occur during the acquisition of images in fluorescence if the plate had been illuminated beforehand in white light, which would interfere with the exploitation of the fluorescence images.

With the image acquisition apparatus 14, it is possible to scan the sample 2 with very fine resolution and to obtain from a same plate, fluorescence or white light images. The analysis plate is scanned line by line. Thus, each acquired image represents a band 18 of small width of the analysis plate. The images set side by side allow an image 20 to be obtained of the entire sample plate 6 and therefore of the entire sample 2, as illustrated in step G of FIG. 1. Such a method for acquiring images line by line is more efficient than the "field by field" acquisition used up to now and with which the multiplicity of the fluorescence passages may be standardised while reducing the risk of bleaching. Thus, the image 20 obtained with a single and same apparatus 14 and in a very simple way, is a true representation of the sample associating a large number of pieces of information in fluorescence and in white light.

The image acquisition apparatus is for example of the Nanozoomer type marketed by Hamamatsu.

The digital data obtained with the apparatus 14 in fluorescence and in white light are then superimposed by a computer processing system so that the computer processing system may switch from data obtained under an illumination to data obtained under the other illumination for each band 18 of the image of the sample.

A virtual analysis plate is thereby obtained, formed with the image 20 and data associated with this image and which may be analyzed by a cell analysis method which will now be described with reference to FIG. 2.

The cell analysis is accomplished by having the images of the sample 2 examined by the physician or the specialized technician responsible for detecting pathological cells, in order to propose a diagnosis which will possibly induce more extensive examinations or even a treatment. For reasons of safety, the presence of the physician or of the specialized technician is mandatory so that the detection of possible pathological cells cannot be entirely automated.

During step H, the images stained by standard staining, such as that of Papanicolaou and acquired in white light, are projected on a display means such as a screen and scroll under the eyes of the physician or of the specialized technician for examination. The scrolling of the images is organized by the computer system and is therefore accomplished automatically. Each image is displayed in a full field without displaying complementary data on the patient in order to avoid dispersing the attention of the physician or of the specialized technician during the analysis (or screening), and this during a predetermined time calculated in order to allow the physician or the specialized technician to observe the entirety of each projected image and to detect a potential abnormality in an image.

The display time of each image may be adjusted by the physician or the specialized technician depending on his/her competencies, or according to other information. For example if the sampling was carried out for a risk patient having a greater probability of having pathological cells, the display time may be adjusted so as to be longer in order to carry out a more thorough examination of the sample. The information on the patient may be associated with the virtual analysis plate by entering this information into a data base and associating it with the image 20 of the sample corresponding to the patient on which this sampling was carried out. The display times may be adjusted automatically depending on this information. For example, the computer system comprises a plurality of pre-adjusted display times and each corresponding to a level of the risk of detecting an abnormality on the patient. This level of risk is indicated by the practitioner carrying out the sampling and is attached to the sampling carried out. Thus, the computer system reports the level of risk and adjusts the display time accordingly. The display time may also be adjusted manually by the physician or the specialized technician.

The scrolling images are therefore those which have been acquired with Papanicolaou staining. The images under this staining allow detection of the possible presence of abnormalities for example corresponding to the presence of pre-cancerous or cancerous cells and the semiology of which, known for a long time, is widely described in the literature. Further, as indicated above, Papanicolaou staining gives the possibility of checking whether the sample actually meets the Bethesda criteria, within the scope of a uterine cervix smear for example and is therefore either a valid sample or not. The Bethesda criteria may be checked automatically by the computer system by means of an image analysis software package. This software package may for example carry out counting of the cells on the image 20 in order to check whether at least 5,000 cells have been sampled and whether certain types of control cells for the good quality of the sample, such as endocervical cells or those of the junction, have been sampled. The software package may also acquire other pieces of information on the cell spreading. This information is attached to the image 20 by the computer system in order to complete the virtual analysis plate.

The physician or the specialized technician observes each image displayed on the screen, and determines whether an abnormality is present or not in step I. This detection may also be carried out automatically by the computer system by means of the image analysis software package.

In the case when neither the physician nor the specialized technician nor the computer system detects any abnormality in the displayed image, the method returns to step H and continues by projecting the next image after elapse of the adjusted display time.

According to an embodiment, a step J is provided, during which the computer system automatically stops scrolling of the images, on an image on which no abnormality is detected and waits for validation by the physician or the specialized technician in order to restart the scrolling. By stopping on such an image, it is possible to analyse in detail so-called reference images in order to confirm that this is considered as a normal sample. The stopping on so-called normal images may be performed at random or after having displayed a certain number of images. The description of the detailed analysis of an image is made below in connection with the analysis of an image having an abnormality.

If an abnormality is detected by the physician or the specialized technician and/or the computer system during step I, the method continues in step K by interrupting the scrolling of the images.

The interruption of the scrolling is performed automatically by the computer system if the latter detects an abnormality, or manually by the physician or specialized technician if he/she wishes to observe an image in more detail or if he/she locates an abnormality.

The image is then displayed with a greater enlargement factor in order to view the abnormality in detail. Information on the patient may then be simultaneously displayed in order to provide an additional aid to the decision of the physician.

The method according to the invention allows automatic stopping of the scrolling of the images on an image showing potentially pathological elements. The method therefore allows a reduction in the rate of false negatives and therefore an increase in the sensitivity of detection of pathological samples, corresponding to abnormalities of the cells which might have passed unchecked by the physician or the specialized technician, because the computer system selects pathological cells on the images acquired in fluorescence as well as in white light, unlike the physician or the specialized technician, the first analysis of whom is only based on the images in white light, i.e. images of the sample stained by the Papanicolaou stain.

During step L, the image displayed under the Papanicolaou stain, and for which scrolling has been interrupted, is associated with the image of the same area taken in fluorescence in order to analyse the sample labeled by fluorophores, morphologically and/or spectrally. With this display, it is possible for the physician or specialized technician to refine his/her analysis of the displayed cells and to either confirm or not if some of them are potentially pathological. Further, with the display of the image in fluorescence, other pieces of information may be displayed simultaneously, such as quantitative data, spectra or information on the patient on which the sampling was carried out, etc. This finer analysis coupled with automated stopping of the scrolling allows a reduction in the number of false negatives. Further, within the scope of the uterine cervix smear for example, the checking of the diagnosis by the physician or specialized technician of the selected areas by the system allows the specificity level of cytological diagnosis to be preserved, which is close to 95% in this case. Consequently, the sensitivity and specificity criteria of the screening smear become closer and higher.

During this step, the physician or the specialized technician may freely perform magnification of particular areas of the displayed image, both in white light and in fluorescence. The physician or the specialized technician may also switch from the image under Papanicolaou staining to the fluorescence image in any way they see fit.

The restarting of the scrolling may only be controlled by the physician or the specialized technician during a step M, for example by actuation of a validation button. With this it is possible to make sure that the scrolling was interrupted automatically, the displayed image possibly having an abnormality has actually been examined by a physician or specialized technician, with which the safety chain may be ensured, a main component of quality assurance. The same applies for normal images displayed during step J as described previously.

The method described above allows rapid and efficient analysis of samples. This method reduces the risk of false negatives by forcing extensive analysis of the images having a potential abnormality.

Further, the training of the physicians or specialized technicians is preserved since all the images are displayed, both normal images and images having abnormalities. This method further allows a great possibility of handling operations notably by associating information on the patient and on the sampling with data of the displayed images.

The invention claimed is:

1. A cell analysis method for a cytological or histological sample placed on an analysis plate, comprising the following steps:

carrying out two different processing operations of the sample, said processing being adapted so as to allow differentiation of pathological cells from healthy cells of the sample, said processing operations being adapted to allow labeling of pathological cells among the cells of the sample;

carrying out two acquisition steps acquiring images of the sample placed on the analysis plate so as to obtain a plurality of images each representing an area of the analysis plate, said images set side by side forming an image of the entire sample, each acquisition step allowing detection of abnormalities according to one of the processing operations carried out on the sample;

automatically scrolling all the acquired images of the sample on display means at a predetermined scrolling rate, said rate being adapted so as to allow an observer to analyse the image and to determine whether the represented sample area comprises potentially pathological cells or not;

stopping the scrolling if at least one abnormality which may signify the presence of a pathological cell is detected;

wherein the stopping of the scrolling is carried out automatically following automated analysis of the image, said stopping being carried out if a particular object, defined as being abnormal is detected in the image;

data of the images acquired by each acquisition step being superimposed to allow the observer to switch from the image of an acquired area according to an acquisition step to the image of the same acquired area according to the other acquisition step during the scrolling of the images.

2. The analysis method according to claim 1, wherein the scrolling rate of the images is adjustable.

3. The analysis method according to claim 1 further comprising a step for restarting the scrolling after analysis of the area of the sample having an abnormality, said restarting step being controlled by the observer.

4. The analysis method according to claim 1, comprising a step for automatically stopping the scrolling on an image which does not have any abnormality or corresponding to objects required for evaluating representativity of the sample, restarting of the scrolling being controlled by the observer after validation that the image does not have any abnormality.

5. The analysis method according to claim 1, wherein the switching from the image of one area according to an acquisition step to the image of the same area acquired according to the other acquisition step is accomplished when an abnormality has been detected in the image.

6. The analysis method according to claim 1 wherein the processing steps are steps for staining or labeling of the sample with fluorophores.

7. The analysis method according to claim 5, wherein the display of the acquired image according to the other acquisition step is accompanied by display of information on the displayed sample area and/or on the entirety of the sample and/or on the patient on which the sampling was carried out.

8. A method for preparing a virtual analysis plate for a sample with view to allowing its cell analysis according to the analysis method according to claim 1, said method comprising the following steps:

preparing a sample, carrying out a first step for processing the sample, said processing allowing the labeling of pathological cells relatively to the other cells, carrying out a second step for processing the sample, said processing allowing the labeling of pathological cells relatively to the other cells, in a different way from the first processing step, depositing the sample on an analysis plate before or after or between the steps for processing the sample, carrying out a first acquisition of images of the sample placed on the analysis plate so as to obtain a plurality of images each representing an area of the analysis plate, said images set side by side forming an image of the entire sample, said images allowing detection of the pathological cells labeled by the first processing step, carrying out a second acquisition of images of the sample placed on the analysis plate so as to obtain a plurality of images each illustrating an area of the analysis plate, said images set side by side forming an image of the entire sample, said images allowing the detection of cell abnormalities other than those labeled by the first processing step, said acquired images forming a virtual analysis plate.

9. The preparation method according to claim 8, comprising a step for superimposing the data of the images acquired during the first acquisition of the images and those of the images acquired during the second acquisition of the images.

10. The preparation method according to claim 8 wherein the first step for processing the sample is a fluorescence labeling step.

11. The preparation method according to claim 10, wherein the first processing step comprises a step for introducing reference beads into the sample, said beads being used as controls for the focusing of the image acquisition.

12. The preparation method according to claim 8, wherein the second step for processing the sample is a Papanicolaou staining step.

13. The cell analysis method according to claim 1, wherein the analysis is accomplished on a virtual analysis plate obtained by a preparation method according to claim 8.

14. A cell analysis method for a cytological or histological sample placed on an analysis plate, comprising the following steps:

carrying out at least one first processing operation of the sample, said processing being adapted so as to allow differentiation of pathological cells from healthy cells of the sample;

carrying out an acquisition of images of the sample placed on the analysis plate so as to obtain a plurality of images each representing an area of the analysis plate, said images set side by side forming an image of the entire sample;

automatically scrolling all the acquired images of the sample on display means at a predetermined scrolling rate, said rate being adapted so as to allow an observer to analyse the image and to determine whether the represented sample area comprises potentially pathological cells or not;

stopping the scrolling if at least one abnormality which may signify the presence of a pathological cell is detected;

wherein the stopping of the scrolling is carried out automatically following automated analysis of the image, said stopping being carried out if a particular object, defined as being abnormal is detected in the image;

enlarging the image in order to allow viewing of a detail of the displayed area.

15. The analysis method according to claim 14, wherein an enlargement rate is adjustable.

* * * * *